US008442811B1

(12) United States Patent
Broniek et al.

(10) Patent No.: US 8,442,811 B1
(45) Date of Patent: May 14, 2013

(54) CONTEXTUAL TRANSLATION OF DIGITAL CONTENT

(75) Inventors: Przemyslaw Broniek, Cracow (PL); Joanna Chwastowska, Tarnow (PL); Brendan Clavin, Los Altos, CA (US); Dawid Duda, Cracow (PL); Terence Haddock, Cracow (PL); Marcin Mikosik, Turek (PL); Maciej Molerus, Zabrze (PL); Michal Pociecha-Los, Cracow (PL); Jan Wrobel, Michalowice (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,641

(22) Filed: Sep. 30, 2011

Related U.S. Application Data

(63) Continuation of application No. 13/036,990, filed on Feb. 28, 2011.

(51) Int. Cl.
*G06F 17/28* (2006.01)

(52) U.S. Cl.
USPC ............ 704/4; 704/8; 704/7; 704/3; 704/277; 704/235; 704/2; 719/328; 717/137; 715/780; 709/250; 709/220; 379/67.1; 379/387.01

(58) Field of Classification Search .................. 704/277, 704/704, 2, 8, 7, 4, 3, 235; 70/277, 704; 719/328; 717/137; 715/780; 709/250, 220; 379/67.1, 379/387.01
See application file for complete search history.

(56) References Cited

U.S. PATENT DOCUMENTS

| | | | | |
|---|---|---|---|---|
| 5,612,872 | A * | 3/1997 | Fujita | 704/2 |
| 5,797,011 | A * | 8/1998 | Kroll et al. | 717/137 |
| 6,345,244 | B1 * | 2/2002 | Clark | 704/2 |
| 6,385,568 | B1 * | 5/2002 | Brandon et al. | 704/7 |
| 6,697,777 | B1 * | 2/2004 | Ho et al. | 704/235 |
| 6,999,916 | B2 * | 2/2006 | Lin et al. | 704/8 |
| 7,130,792 | B2 * | 10/2006 | Tokieda et al. | 704/7 |
| 7,277,845 | B2 * | 10/2007 | Chino | 704/2 |
| 7,721,303 | B2 * | 5/2010 | Alves de Moura et al. | 719/328 |
| 8,050,906 | B1 * | 11/2011 | Zimmerman et al. | 704/2 |
| 8,346,536 | B2 * | 1/2013 | Jiang et al. | 704/2 |
| 2001/0029455 | A1 * | 10/2001 | Chin et al. | 704/277 |
| 2003/0009320 | A1 * | 1/2003 | Furuta | 704/2 |
| 2003/0040900 | A1 * | 2/2003 | D'Agostini | 704/2 |
| 2003/0069997 | A1 * | 4/2003 | Bravin et al. | 709/250 |
| 2005/0010419 | A1 * | 1/2005 | Pourhamid | 704/277 |
| 2006/0095424 | A1 * | 5/2006 | Petropoulos et al. | 707/3 |
| 2006/0126821 | A1 * | 6/2006 | Sahashi | 379/387.01 |

(Continued)

OTHER PUBLICATIONS

SDL Trados Studio Product Brief, Copyright 2010 SCL PLC., Downloaded from www.sdl.com on Nov. 9, 2010.

(Continued)

*Primary Examiner* — Michael Colucci
(74) *Attorney, Agent, or Firm* — Shumaker & Sieffert, P.A.

(57) ABSTRACT

Methods and apparatus, including computer program products, implementing and using techniques for translating digital content from a source language to a target language. A message is displayed to a user. The message contains digital content to be translated from the source language to the target language, as well as the context of the digital content in the source language and/or a reference to a context in which the digital content occurs. A proposed translation of the digital content into the target language is received from the user. The proposed translation is submitted to a translation server.

20 Claims, 5 Drawing Sheets

U.S. PATENT DOCUMENTS

| | | | |
|---|---|---|---|
| 2006/0136223 A1* | 6/2006 | Brun et al. | 704/277 |
| 2006/0165225 A1* | 7/2006 | Sahashi | 379/67.1 |
| 2006/0282255 A1* | 12/2006 | Lu et al. | 704/2 |
| 2008/0162112 A1* | 7/2008 | Andersen et al. | 704/2 |
| 2008/0288240 A1* | 11/2008 | D'Agostini | 704/3 |
| 2009/0132232 A1* | 5/2009 | Trefler | 704/2 |
| 2009/0182547 A1* | 7/2009 | Niu et al. | 704/2 |
| 2009/0192783 A1* | 7/2009 | Jurach et al. | 704/4 |
| 2010/0082778 A1* | 4/2010 | Muilenburg et al. | 709/220 |
| 2010/0107114 A1* | 4/2010 | Zachcial | 715/780 |
| 2010/0138211 A1* | 6/2010 | Shi et al. | 704/3 |
| 2010/0305940 A1* | 12/2010 | Dendi et al. | 704/3 |

OTHER PUBLICATIONS

SDL WorldServer Product Brief, Copyright 2010 SCL PLC., Downloaded from www.sdl.com on Nov. 9, 2010.

U.S. Appl. No. 13/036,990, by Przemyslaw Broniek, filed Feb. 28, 2011.

Response to Office Action dated Nov. 7, 2012, from U.S. Appl. No. 13/036,990, filed Mar. 7, 2013, 9 pp.

* cited by examiner

CONTEXTUAL TRANSLATION OF DIGITAL CONTENT

This Application is a continuation of U.S. application Ser. No. 13/036,990, filed Feb. 28, 2011, the entire content of which is incorporated herein by reference.

BACKGROUND

This various implementations described herein relate to translation of digital content. One example of digital content is a web page, which can be described as a resource of information that is suitable for the World Wide Web (WWW). Typically web pages reside on a remote, publicly available web server and are accessed by client computers through a web browser. Web pages can also be stored on a local computer or on a web server that is restricted to a private network, such as a company's Intranet. The web pages are typically stored in Hypertext Markup Language (HTML) format, or in Extended Hypertext Markup Language (XHTML), and are requested by the clients using a Hypertext Transfer Protocol (HTTP).

Web pages typically contain many types of page elements, for example, hypertext links, which provide functionality allowing a user to navigate to other web pages. Web pages can be static or dynamic in nature. Static web pages do not allow any user interaction, except for navigating to, from, and within the web page itself. Dynamic web pages, on the other hand, often provide a high degree of user interactivity, and can be used to present a user interface to live web applications. Some examples of such applications include word processors, calendars, hosted email programs, online spreadsheets, presentation tools, etc. These dynamic web pages are also often referred to as web applications or web application pages. Other examples of digital content include various types of software applications that can be run on various computing devices, such as desktop or laptop computers, mobile phones, PDAs (Personal Digital Assistants), and the like.

Web pages and software applications are often translated into several languages to make them accessible to users across the world. Conventionally, in making such translations, the translators are provided with a list of phrases used on the web page or in the software application user interface, the translator translates the phrases, and the phrases appearing on the original web page or software application user interface are substituted with the translated phrases. However, without having a context for the phrases, it is often difficult for the translator to make an accurate translation, since there is often not a one-to-one correspondence between phrases in different languages, but a given phrase in one language can have many meanings in a different language, depending on the context for the phrase. This is true, in particular for web applications, where the phrases may occur in different positions on the web page, as the web page changes dynamically. As a result of the lack of context for the phrases to be translated, the translation quality may end up being poor, which in turn causes the review of the translation to be inefficient and time consuming. The erroneously translated phrases must also be corrected, which adds further time to the translation process.

SUMMARY

In one aspect, methods, apparatus and systems, including computer program products, for translating digital content from a source language to a target language are provided. A message is displayed to a user. The message contains digital content to be translated from the source language to the target language, as well as the context of the digital content in the source language and/or a reference to a context in which the digital content occurs. A proposed translation of the digital content into the target language is received from the user. The proposed translation is submitted to a translation server.

Various implementations can include one or more of the following features. The context of the digital content in the source language can be displayed in response to the user selecting the reference. The part of the digital content can be highlighted in the context. The proposed translation can be stored in the translation server and one or more actions pertaining to the proposed translation can be performed by the translation server. The one or more actions including: notifying a reviewer of the proposed translation, verifying user credentials for the user providing the proposed translation, providing further suggestions of proposed translations to the user based on previously submitted translations, or providing translation-related metadata to the user. The context can be represented as hypertext markup language code rendered in a web browser, a live representation of the digital content in a software application, or an image screenshot of the context of the digital content.

The translated digital content can be displayed to a reviewer in a review tool and input can be received from the reviewer pertaining to any translated phrases that need to be corrected. The input can be received in a window pane that is part of the web browser window in which the translated digital content is displayed, in a web browser window that is distinct from the web browser window in which the translated digital content is displayed, in a form that is embedded in the translated web page, or in a software application that is distinct from the web browser window in which the web page is displayed. The context for the translated digital content can be updated to show the proposed translation to the user after submitting the translation, thereby providing the possibility to immediately review the proposed translation. The input from the reviewer can be submitted to the translation server for further processing. The digital content can represent words or phrases on a web page. Displaying the context can include displaying the webpage on which the words or phrases occur. The digital content can represent words or phrases on at least a portion of a graphical user interface of a software application program.

Various implementations can include one or more of the following advantages. The translation quality of digital content and the translation efficiency can increase by having a context of the words or phrases being translated. Similarly, the quality and efficiency of the review of the translated digital content can also increase by having a context of the words or phrases being translated. By having the ability to identify the words or phrases in their context, such as on a web page, it is possible to have a live application with which a user can interact. As a result, the translation review is driven not only by external translation software, but also by the user working with a live application and attending to any issues the user notices.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

The present description provides methods and apparatus for improving the translation quality of digital content, as well as improving the review of the translated digital content to make the review more efficient. A number of implementations will be described below by way of example and with respect to translating and reviewing translated web pages. As the skilled reader realizes, these examples are not intended to be exhaustive. On the contrary, the techniques and tools that will be described below can be used in a wide array of applications, such as translating and reviewing user interfaces of various types of software applications. Furthermore, while the various implementations will be described with respect to a general purpose computer, it should be clear that the same or similar techniques can be implemented on other types of computing devices, such as PDAs (Personal Digital Assistants), mobile phones, and so on. It should further be noted that while reference will be made below to web applications, these are intended to encompass not only dynamic web pages but also static web pages, that is, web pages where contents changes dynamically and web pages or web applications, in which the displayed content can change dynamically, as well as standalone software applications run on various computing devices.

Translation Example

Various implementations address the above described problem of low translation quality and efficiency caused by lack of a context for the messages being translated. This section describes how the translation quality and efficiency can be improved in accordance with one implementation.

Typically, a professional translator works with some kind of dedicated translation software application. There are many types of translation software applications. Two examples include the WorldServer™ Desktop Workbench 2009 application and the SDL TRADOS Studio 2009 application, which are both available from SDL Enterprise Technology of Maidenhead, United Kingdom. Generally, the translation software application loads a file with one or more translation requests that contain phrases that should be translated by the professional translator. For example, a conventional translation request without context for translating the phrase "Promoted Videos" in a header can have the following format:
//MESSAGE 12345978
//[ENGLISH MESSAGE]
//Promoted Videos
//
//[DESCRIPTION]
//Header.
//

As can be seen, this textual message provides very little context for the translator, other than that the phrase occurs in a header.

Figure 1:
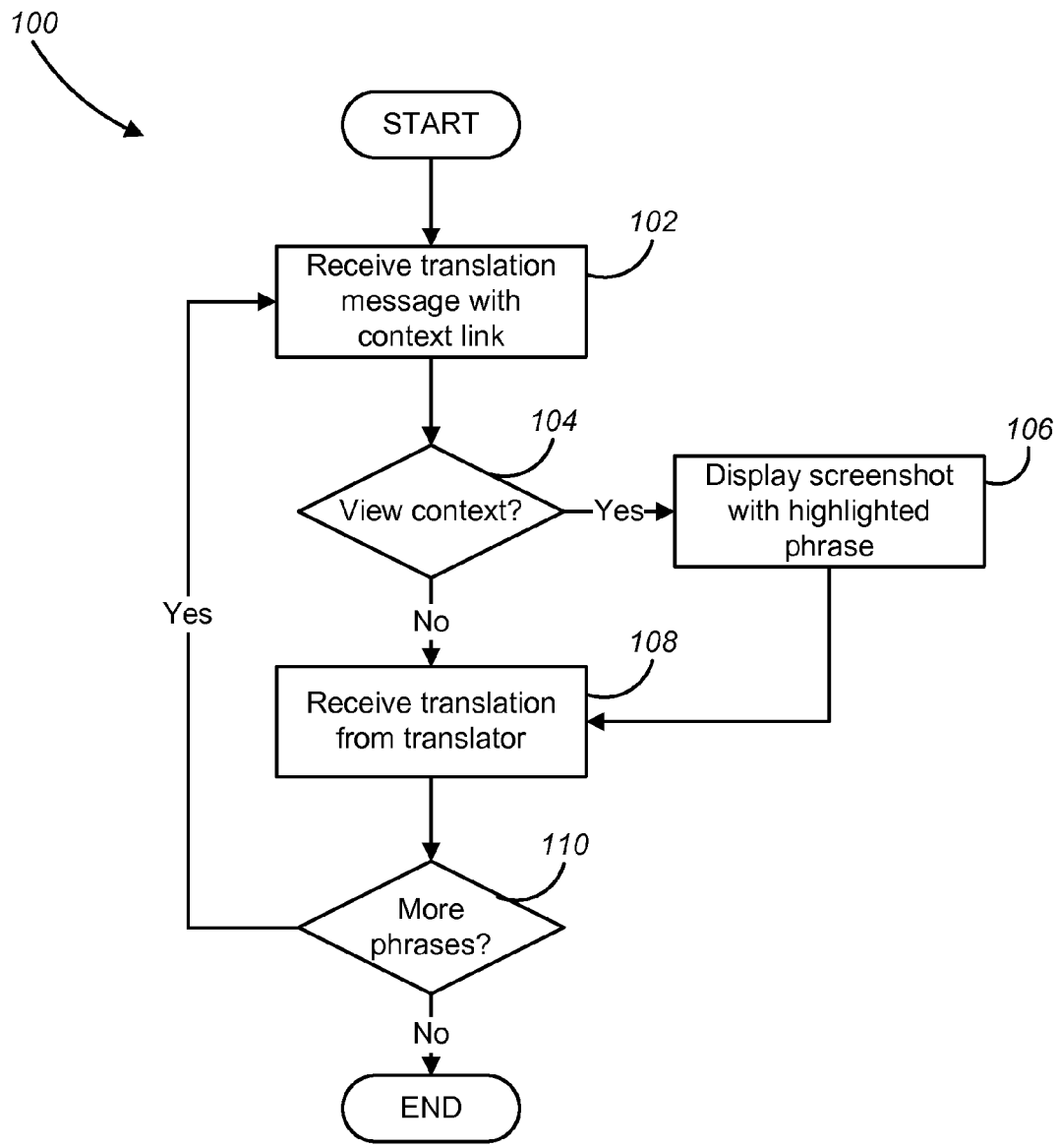
FIG. 1 shows a process for translating phrases on a web page from a source language to a target language, in accordance with one implementation.

FIG. 1 shows an improved method (100) for translating one or more phrases from a source language to a target language, in accordance with one implementation. As can be seen in FIG. 1, the process (100) starts with the translation software application receiving a request that contains a phrase to be translated from a source language to a target language (step 102), similar to what was described above. However, in contrast to conventional requests of the type described above, this request is an enhanced request that provides a better context for the professional translator. In one implementation, the enhanced translation request for translating the same phrase can have the following format:
//MESSAGE 12345978
//[ENGLISH MESSAGE]
//Promoted Videos
//
//[DESCRIPTION]
//Header.
//
//[CONTEXT]
//http://translationcontext/ab654df5d4af42c
//

Figure 3:
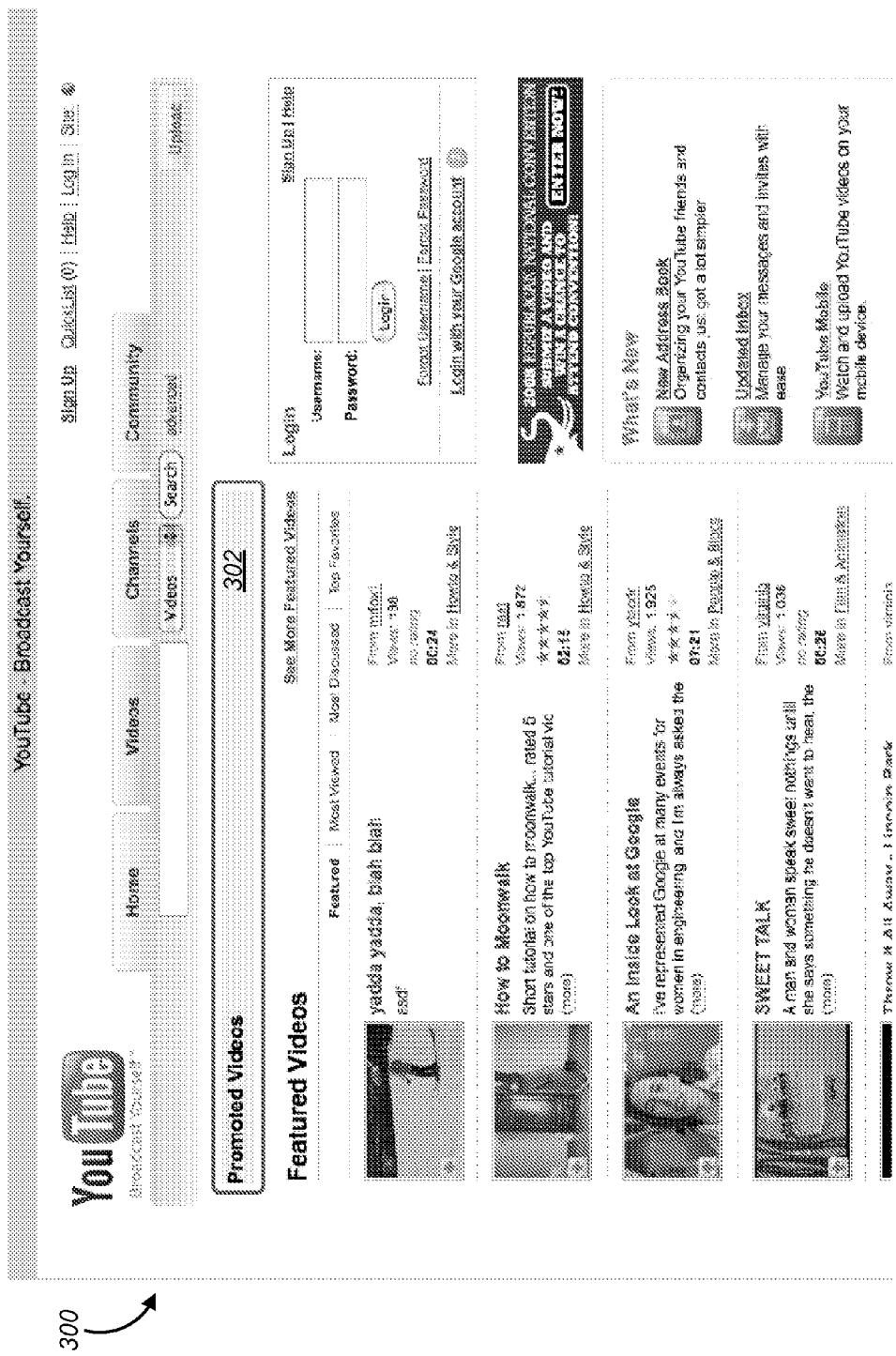
FIG. 3 shows a screenshot of a web browser (300) displaying a web page indicating a location of a phrase to be translated, in accordance with one implementation.

As can be seen, in this enhanced translation request, a context link is included at the bottom of the request. The translator then decides whether she wants to see the context of the phrase (step 104). If the translator does not want to see any context, she enters a translation in the translation software application (step 108), similar to what is done in conventional translation situations. On the other hand, if the translator clicks on the context link, she is presented with a screenshot of the web page (step 106). FIG. 3 shows an example of such a screenshot (300), in which the location on the web page of the phrase (302) to be translated is clearly indicated. As can be seen in FIG. 3, the phrase (302) to be translated is marked with a frame, typically in a color that highlights the phrase (302), thus facilitating for the translator to identify the phrase (302) on the web page. As the skilled person realizes, the phrase (302) can be marked with any suitable identifier, such as a symbol, or be highlighted in a different color, etc. The translator enters the corresponding expression in the target language, in this case the Polish phrase "Promowane filmy wideo," in her translation software applicatoin (step 108). Finally, it is determined whether there are any more phrases to be translated (step 110). If there are more phrases, the process returns to step 102 and continues as described above with another phrase that is to be translated. Given the ability to view the context for each phrase, it is significantly easier for the translator to make an accurate translation. If there are no more phrases or words to be translated, the process (100) ends.

In Context Translation Review Example

Figure 2:
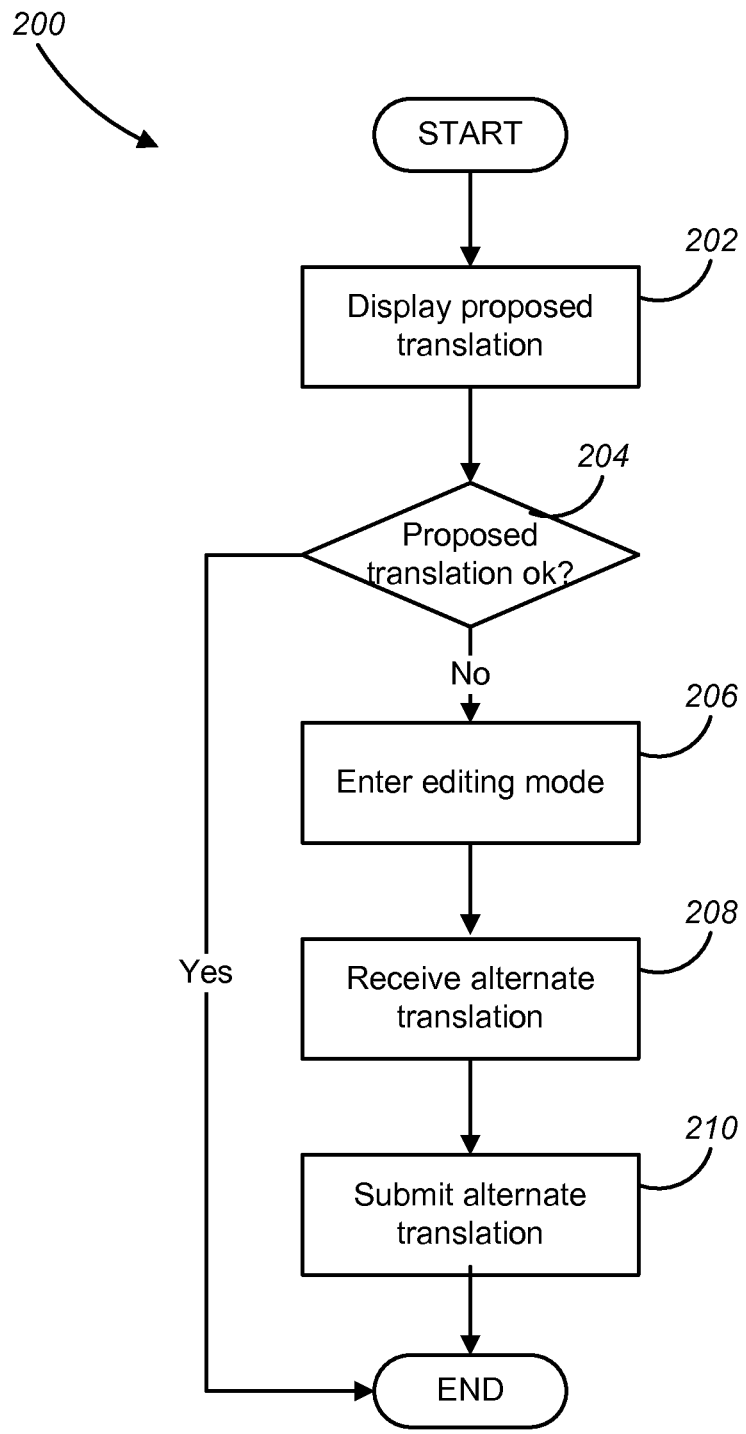
FIG. 2 shows a process for reviewing translated phrases on a web page, in accordance with one implementation.
Figure 4:
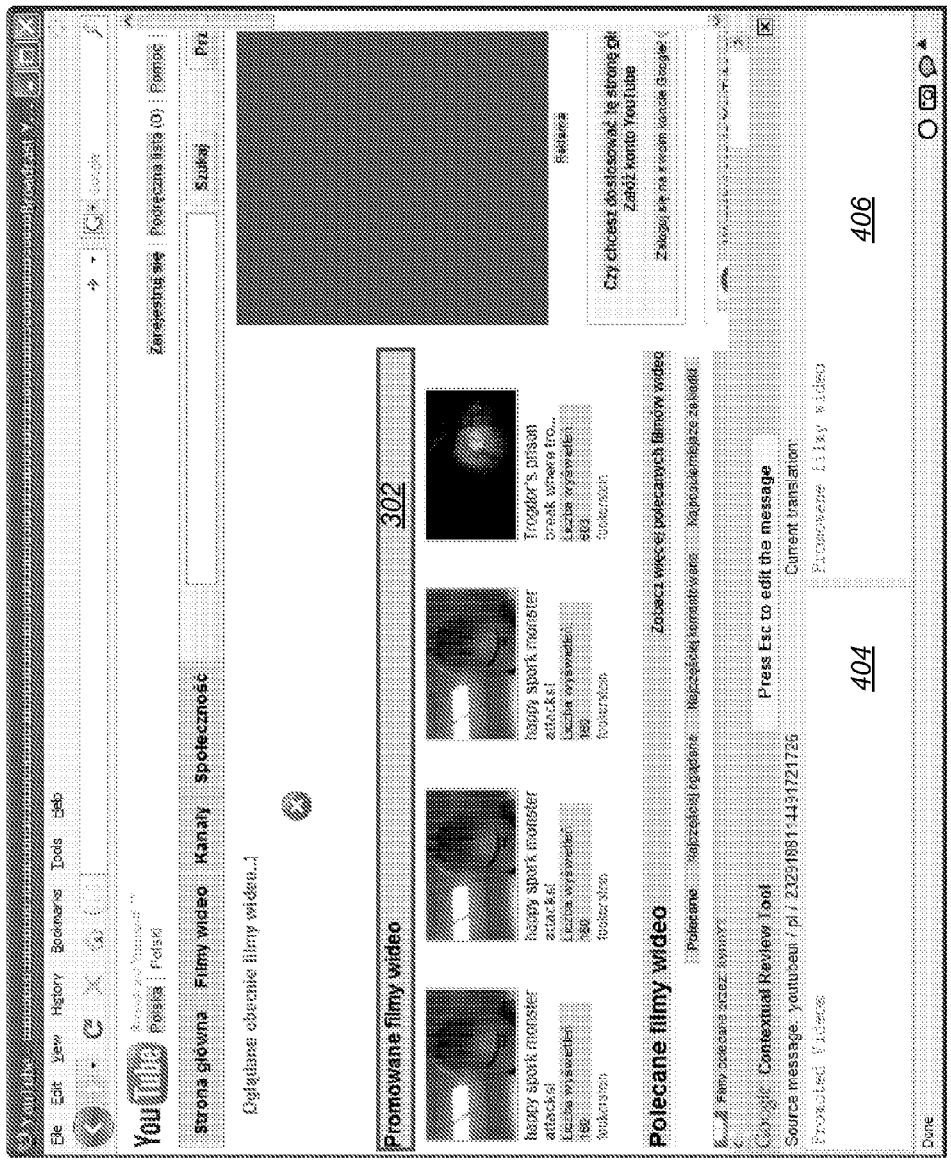
FIG. 4 shows a screenshot of a web browser (300) displaying a web page in translation mode, in accordance with one implementation.

FIG. 2 shows a process for reviewing a proposed translation in accordance with one implementation. During the review process, the reviewer examines the translated page in the target language to check the consistency and correctness of the translation. A review screen (400) with the proposed translation is displayed to the reviewer (step 202). FIG. 4 shows an example of such a review screen (400), in which a source message frame (404) shows the source language phrase and a translation message frame (406) shows the phrase translated into the target language.

Figure 5:
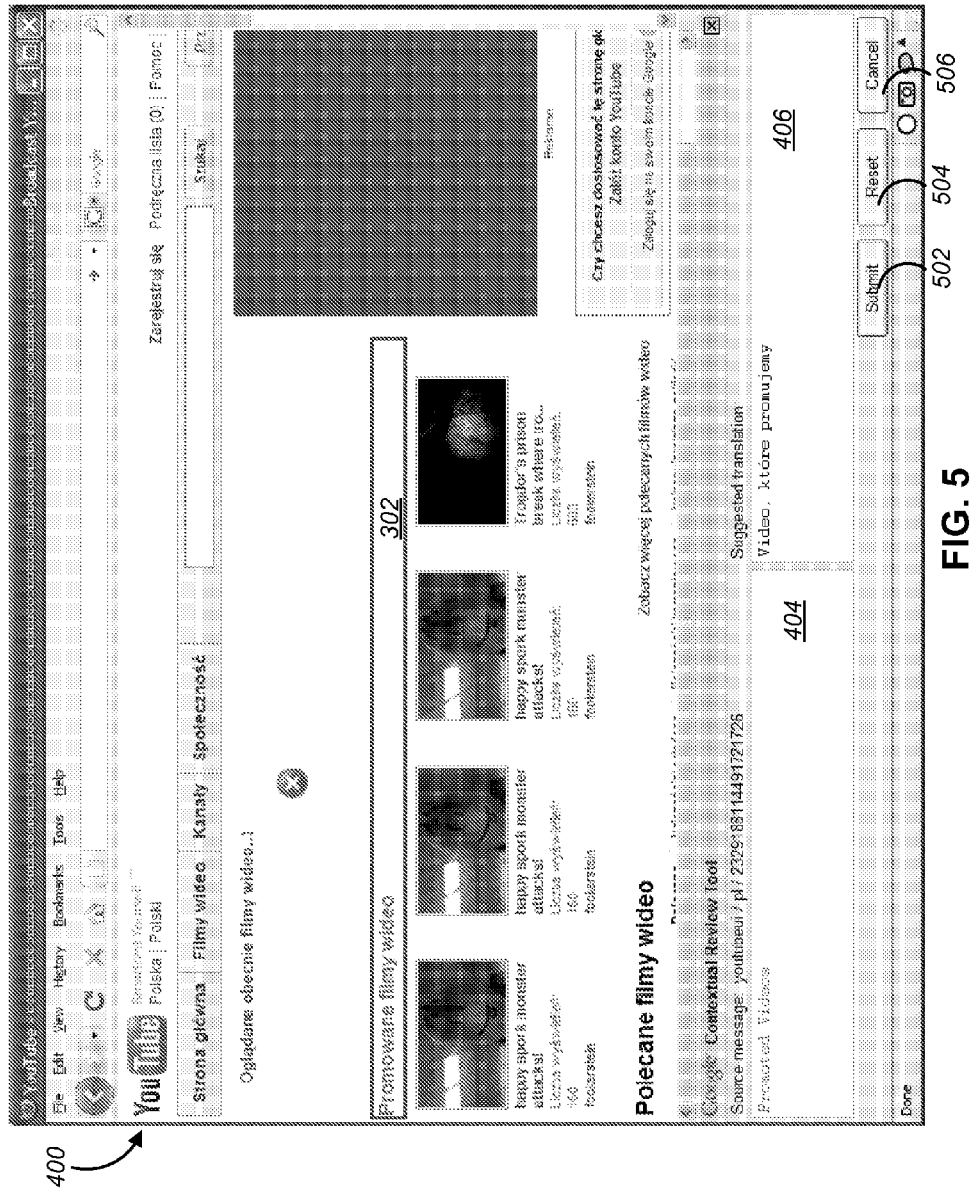
FIG. 5 shows an editing mode of the web page (300) in which a user can revise proposed translations, in accordance with one implementation.

The reviewer then determines whether the translation is accurate (step 204). If the reviewer approves the translation, nothing else needs to be done and the process (200) ends. If the reviewer detects a discrepancy or decides that some translation of a phrase should be examined more carefully, the reviewer can enter an "edit mode" (step 206). FIG. 5 shows an example of such an edit mode in accordance with one implementation. In the edit mode, the translator can enter comments or corrections in the translation message frame (406). In some implementations, this "editing mode" is entered by pressing a button on the screen or on the keyboard, such as the ESC button indicated by the instructions above the message fields (404; 406) in FIG. 4. The translation message frame (406) is editable, so that the reviewer can enter an alternate translation into the translation message frame (406), such as the shown revised translation "Video, ktore promujemy" (step 208).

Once the reviewer has entered the revised translation in the translation message frame (406), she can click one of three buttons; a submit button (502) to submit the translation (typically to a translation server, which will be described in more detail below) (step 210), which ends the process. In the event that the reviewer changes her mind, there is also a reset button (504) that restores all original values, and a cancel button (506) that prevents the translation from being submitted and closes the translation console.

Translation Review Example

It should be noted that the translation review of course can be used in combination with other translation review software applications too, similar to what was described in the above translation example. That is, the reviewer is not required to make comments and corrections at the bottom of the review page (400), as described with respect to the in-context review above. Instead, the user may use separate translation review software application, and receive messages with translated phrase, which messages contain links that allow the reviewer to see a screenshot similar to the one in FIG. 2 with the context of the phrase, and then making any modifications or comments about the suggested translation using the other translation review software application.

Implementation Details and Alternatives

The above processes (100; 200) can be implemented, for example, as a web browser extension, in combination with a translation server. The web browser extension and the translation server can communicate in a conventional manner through a wired or wireless network, or a combination thereof, as is well known to those of ordinary skill in the art. In this implementation, the user interacts with the web browser extension through the web browser, to perform the above-described steps. In some implementations, it may be advantageous for the web browser extension to be generic and obtain information from the translation server.

In some implementations, the translation server provides several functions for the browser extension. Some of these functions include the following.

The translation server can serve additional information needed to improve the user experience, such as data about different languages between which the messages are being translated, the original content for the messages being translated, various translation-related metadata, etc. In some implementations, previous translations of the message or pending suggestions for a message can also be provided.

The translation server can forward corrections by the reviewer to different systems responsible for storing the translation data. The suggestion must typically be approved to appear in the final version of the web page or software product that is being translated.

The translation server can provide functionality that allows the browser extension to verify that the user has logged in before any types of advanced actions can be carried out.

The translation server can provide the translator with suggested translations, which may have been used in the past, to facilitate for the translator to find an accurate translation that is consistent with phrases that are used elsewhere within a webpage, website, or software application.

In some implementations, the translation server can also perform various other tasks, in addition to communicating with the web browser extension. As was described above, the translation server can act as a backend for the web browser extension. That is, the translation server can provide metadata, such as various permissions and rules defining which users may access and translate specific web pages, provide web pages for translation, or even provide a complete user interface of a web application or standalone software application. The translation server can also store the translations in a translation database, and forward the proposed translations to internal or external individual reviewers or translation services. The translation server may also provide a web interface for a translation database.

It should be noted that the techniques described above assume that there is a way to identify messages and their locations within web pages. As the skilled person realizes, there are multiple ways to identify messages and their locations. In one implementation, an extended XTHML (Extensible Hypertext Markup Language) structure of the page can be used, similar to what is done in many current applications, such as the Facebook social networking application, available from Facebook of Palo Alto, Calif. In another implementation, a set of characters that are invisible to the end user can be used to identify the messages in the web pages.

Various implementations can be made in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various implementations can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various implementations can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network. The above-described devices and materials will be familiar to those of skill in the computer hardware and software arts.

It should be noted that the various implementations described herein employ computer implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, the user interface can be updated dynamically with the proposed translation after the proposed translation has been submitted. This allows the translator to immediately detect, for example, whether any proposed phrases in the target language are too long to fit within a particular user interface element, such as a button, or the like. As a result, the translator can then change the translation and use an alternative, shorter phrase. Accordingly, other implementations are within the scope of the following claims.

The invention claimed is:

1. A computer-implemented method for translating digital content from a source language to a target language, the method comprising:
providing for display, by at least one processor, a message containing digital content from a page to be translated from the source language to the target language and a context of the digital content in the source language, wherein the context of the digital content includes a representation of at least a portion of the page including the digital content and further includes additional digital content in the source language in the page, and wherein the representation of the page preserves a layout and style of the digital content and of the additional digital content in the page;
receiving, by the at least one processor, a proposed translation of the digital content into the target language; and
submitting, by the at least one processor, the proposed translation to a translation server.

2. The method of claim 1, wherein at least part of the digital content is highlighted in the context.

3. The method of claim 1, further comprising:
storing the proposed translation in at the translation server; and
performing one or more actions pertaining to the proposed translation by the server, the one or more actions including: notifying a reviewer of the proposed translation, verifying user credentials for the user providing the proposed translation, providing further suggestions of proposed translations to the user based on previously submitted translations, or providing translation-related metadata to the user.

4. The method of claim 1, wherein the context is represented as one or more of: hypertext markup language code rendered in a web browser, a live representation of the digital content in a software application, or an image screenshot of the context of the digital content.

5. The method of claim 1, further comprising:
displaying the translated digital content to a reviewer in a review tool; and
receiving input from the reviewer pertaining to any translated phrases for correction.

6. The method of claim 5, wherein receiving input from the reviewer includes one or more of:
receiving input in a window pane that is part of a web browser window in which the translated digital content is displayed;
receiving input in a web browser window that is distinct from the web browser window in which the translated digital content is displayed;
receiving input in a form that is embedded in the web browser window in which the translated digital content is displayed; and
receiving input in a software application that is distinct from the web browser window in which the translated digital content is displayed.

7. The method of claim 1, further comprising:
updating the context for the translated digital content to show the proposed translation to the user after submitting the translation.

8. The method of claim 5, further comprising:
submitting the input from the reviewer to the translation server for further processing.

9. The method of claim 1, wherein the digital content represents words or phrases on a web page.

10. The method of claim 9, wherein displaying the context includes displaying the web page, or a portion thereof, on which the words or phrases occur.

11. The method of claim 1, wherein the digital content represents words or phrases on at least a portion of a graphical user interface of a software application program.

12. A computer program product for translating digital content from a source language to a target language, the computer program product comprising:
a computer readable storage medium having computer readable program code embodied therewith, that when executed by a computer causes the computer to:
provide for display a message to a user, the message containing digital content from a page to be translated from the source language to the target language and a context of the digital content in the source language, wherein the context of the digital content includes a representation of at least a portion of the page including the digital content and one or more additional digital content in the source language in the page, and wherein the representation of the page preserves a layout and style of the digital content and the one or more additional digital content in the page;

receive from the user a proposed translation of the digital content into the target language; and submit the proposed translation to a translation server.

13. The computer program product of claim 12, further comprising computer readable program code configured to:

store the proposed translation in at the translation server; and perform one or more actions pertaining to the proposed translation by the server, the one or more actions including: notifying a reviewer of the proposed translation, verifying user credentials for the user providing the proposed translation, providing further suggestions of proposed translations to the user based on previously submitted translations, or providing translation-related metadata to the user.

14. The computer program product of claim 12, wherein the context is represented as one or more of: hypertext markup language code rendered in a web browser, a live representation of the digital content in a software application, or an image screenshot of the context of the digital content.

15. The computer program product of claim 12, further comprising computer readable program code configured to:

display the translated digital content to a reviewer in a review tool; and receive input from the reviewer pertaining to any translated phrases for correction.

16. The computer program product of claim 12, further comprising computer readable program code configured to:

update the context for the translated digital content to show the proposed translation to the user after submitting the translation, thereby providing the possibility to immediately review the proposed translation.

17. The computer program product of claim 15, further comprising computer readable program code configured to:

submit the input from the reviewer to the translation server for further processing.

18. The computer program product of claim 12, wherein the digital content represents words or phrases on a web page.

19. The computer program product of claim 17, wherein displaying the context includes displaying a web page, or a portion thereof, on which the words or phrases occur.

20. A system for translating digital content from a source language to a target language, the system comprising:

one or more processors;

a display mechanism configured to provide for display a message to a user, the message containing digital content from a page to be translated from the source language to the target language and a context of the digital content in the source language, wherein the context of the digital content includes a representation of at least a portion of the page including the digital content and one or more additional digital content in the source language in the page, and wherein the representation of the page preserves a layout and style of the digital content and the additional digital content in the page;

a receive mechanism operable by the one or more processors and configured to receive from the user a proposed translation of the digital content into the target language; and a submit mechanism operable by the one or more processors and configured to submit the proposed translation to a translation server.

* * * * *